April 26, 1960 S. D. ROSS 2,934,681
ELECTROLYTES
Filed June 11, 1956

INVENTOR.
SIDNEY D. ROSS
BY Roland A. Dexter
HIS ATTORNEY

United States Patent Office 2,934,681
Patented Apr. 26, 1960

2,934,681

ELECTROLYTES

Sidney D. Ross, Williamstown, Mass., assignor to Sprague Electric Company, North Adams, Mass., a corporation of Massachusetts Application June 11, 1956, Serial No. 590,711

10 Claims. (Cl. 317—230)

The present invention relates to a new and improved type of electrolytes. More particularly, it relates to electrolytes which are particularly advantageous for use in various electrical devices, such as for example, electrolytic capacitors.

If any author should write a history of the development of electrolytic capacitors, such a volume would be concerned largely with the electrolytes used in such units. Originally, many inorganic aqueous solutions, such as solutions of various inorganic salts, acids or bases, were employed as the electrolytes in such capacitors. Electrolytes of this broad category had many inherent disadvantages, not the least of which is the fact that they could not be employed over a very wide range of temperatures due to the inherent properties of the solvent in such systems. Gradually, through the years the capacitor industry has more or less standardized on electrolytes for electrolytic capacitors which consist of viscous mixtures of polyhydric glycols, water, and either boric acid or various salts, such as ammonium pentaborate. This last category of electrolytes are comparatively cheap to manufacture and possess comparatively good electrical characteristics. Unfortunately, however, they cannot be used over extremely wide temperature ranges.

Figure 1:
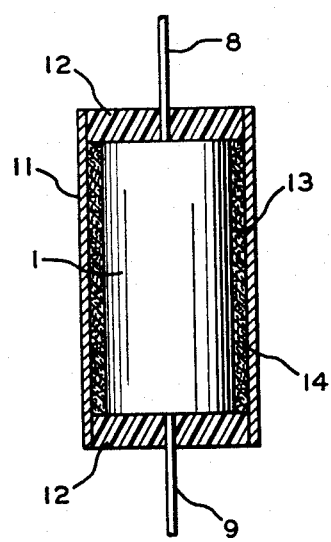
Figure 2:
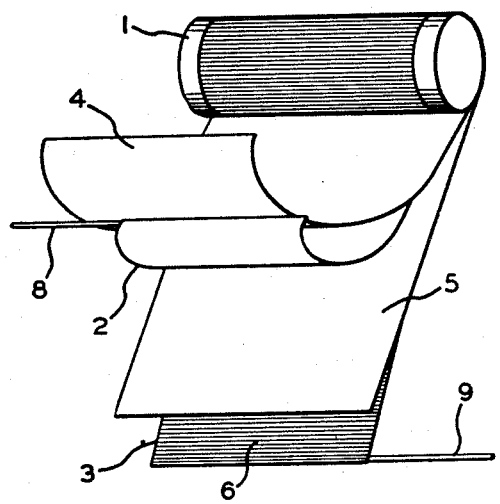
Figure 3:
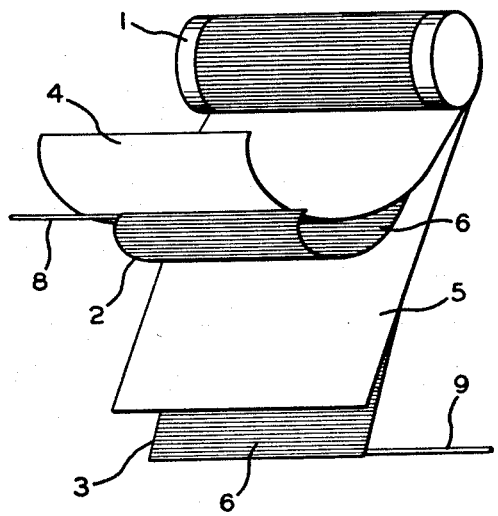
Figure 4:
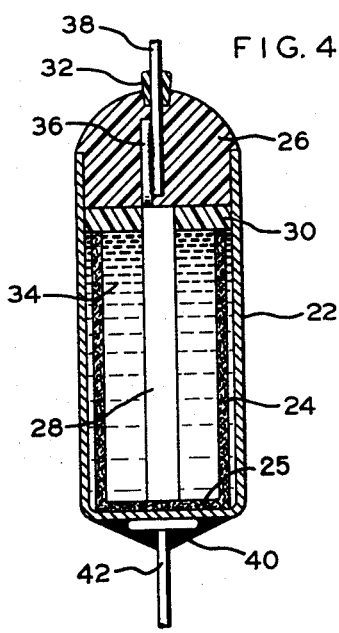

It is an object of the present invention to produce a new type of electrolyte which can be used over extremely wide temperature ranges and which possesses comparatively good electrical characteristics. Further objects of the invention, as well as the advantages of it, will be apparent from the specification and the appended drawings in which Fig. 1 is a front elevation, in section, of a rolled foil electrode electrolytic capacitor sealed within a can; Figs. 2 and 3 are perspective views of the condenser unit of Fig. 1 removed from the can and partially unrolled to show its construction with the former of the polarized type and the latter of the non-polarized type; and Fig. 4 is a front elevation, in section, of an electrolytic capacitor having a wire anode.

Briefly, the above aims are achieved by utilizing as a solvent in electrolytic systems organic esters of inorganic acids, such as for example, phosphoric acid, phosphorous acid, phosphonic acid, phosphinous acid, sulfinic acid, sulfonic acid, sulfuric acid, and vanadic acid.

The organic radicals employed with the invention in forming organic esters are preferably alkyl in nature. Highly suitable alkyl radicals are methyl, ethyl, propyl, isopropyl, butyl, tertiary butyl, amyl, etc. Preferably, such alkyl radicals are selected from the group of lower alkyls containing no more than six carbon atoms. Suitable aryl esters may also be employed as solvents within the broad scope of the instant invention.

These solvents taught herein are used with a salt of a non-metallic cation and an oxidizing anion as both formation and working electrolytes in electrolytic capacitors having at least one electrode coated with an oxide layer that serves as the dielectric. The electrode can be of any one of the common film-forming valve metals particularly aluminum, tantalum, zirconium, columbium and vanadium.

For convenience, organic esters of the preferred category of the invention, that is, organic esters of phosphoric, phosphonic, phosphorous and phosphinous acid, are tabulated below by structural characteristics. The preferred organic esters of the specified inorganic acids are characterized by a wide range of temperature between their respective melting and boiling points which range encompasses the desired operating range for the electrolyte. Additional features which make these esters preferred are low vapor pressures, ability to solvate the preferred solutes for use in a non-aqueous electrolytic solution, and a sufficiently high dielectric constant, which features are highly desirable for use in electrical applications. Thus, these esters listed hereafter are highly desirable for use in electrical applications. Thus, these esters listed hereafter are highly suitable as solvents in the broad scope of the instant invention and indicative of the specific solvents falling within the preferred classes:

I. TERTIARY PHOSPHATE ESTERS

*a. Compounds with the ester linkage to an aliphatic carbon*

|  | Boiling points (° C./mm. pressure) |
|---|---|
| (1) Hydrocarbon derivatives— |  |
| Trimethyl phosphate | 197.2/760 |
| Dimethyl thiomethyl phosphate, $(CH_3O)_2(CH_3S)PO$ | 107/20 |
| Dimethyl ethyl phosphate | 203.3/760 |
| Triethyl phosphate | 216/770 |
| Ethyl thiophosphate | 216/745 |
| Trithioethyl thiophosphate, $(C_2H_5S)_3PS$ | 182/20 |
| Tripropyl phosphate | 138/47 |
| Tri-n-butyl phosphate | 180/20 |
| Diethyl butyl phosphate | 123/15 |
| Tri-isoamyl phosphate | 143/3 |
| Butyl di-isoamyl phosphate | 145/4.5 |
| (2) Halogen derivatives— |  |
| Diethyl, 2 fluoroethyl phosphate, $(C_2H_5O)_2(FCH_2CH_2O)PO$ | 123/13 |
| Diethyl-2-chloroethyl phosphate | 144/18 |
| (3) Derivatives with hydroxy group— |  |
| Dimethyl 1-methoxy ethyl phosphate | 112/9 |
| Tri-1-ethoxy ethyl phosphate | 225/20 |
| (4) Carboxylic derivatives— |  |
| Diethyl-[1-methyl-2-(ethyl carboxylate)] vinyl phosphate, $(C_2H_5O)_2(C_2H_2OCCH\!=\!CCH_3O)PO$ | 138/2 |
| Diethyl - [1-methyl-2-(ethyl carboxylate)] vinyl thiophosphate, $(C_2H_5O)_2(C_2H_5OCCH\!=\!CCH_3O)PS$ | 154/5 |

*b. Compounds with ester linkage to a cyclic structure*

|  |  |
|---|---|
| (1) Derivatives of cyclic hydrocarbons— |  |
| Diethylphenyl phosphate | 200/70 |
| Dibutylphenyl phosphate | 183/15 |
| Naphthyl di-isoamyl phosphate | 142/0.5 |
| (2) Halogen derivatives—diethyl - 2 - chlorophenyl phosphate | 140/2 |

II. TRIALKYL PHOSPHITES

|  |  |
|---|---|
| Triethyl phosphite | 155/757 |
| Tripropyl phosphite | 206/760 |
| Tributylphosphite | 127/18 |
| Tri-isobutyl phosphite | 135/10 |
| Tri-isoamyl phosphite | 207/760 |

III. NEUTRAL ESTERS OF PHOSPHONIC ACIDS

| | Boiling points (° C./mm. pressure) |
|---|---|
| Dimethyl methane phosphonate | 181/760 |
| Diethyl methane phosphonate | 192/760 |
| Di-n-tolyl methane phosphonate | 200/7 |
| Diethyl ethane phosphonate | 203/750 |
| Dibutyl ethane phosphonate | 137/17 |

IV. NEUTRAL ESTERS OF PHOSPHINOS ACIDS

| | |
|---|---|
| Ethyl-2-bromo ethyl-ethylphosphinate | 129/11 |
| Ethyl-ethylphenylphosphinate | 162/16 |
| Dipropyl ethyl phosphinate | 103/15 |
| Methyl phenyl ethyl phosphinate | 125/15 |
| Ethyl phenyl ethyl phosphinate | 137/15 |
| Bis(phenyl) phenyl phosphinate | 265/62 |
| Dibutyl ethyl phosphinate | 116/15 |

It must be realized that the broad concept of this invention is directed toward the use of non-aqueous solvents for electrolytic solutes which makes possible an electrolytic solution having a wide temperature range of operation in addition to the requisites for electrolytes which are utilized in the electrical industry, and in particular, where these electrolytes are used in electrolytic capacitors, they must offer systems which are stable under high electrical stress, must allow dissociation of the solute so that the solution offers low resistive ionic conduction, and must facilitate the film formation on the part of the solutes of the valve metal which is used as at least one of the electrodes. In addition to these phosphorous containing compounds which have been set forth as a preferred group, there are many organic esters of inorganic acids falling within the scope of this present invention which meet the requirements imposed by the use of electrical components. The broad classes of these compounds which additionally fulfill these requirements, are the organic esters, preferably alkyl esters, of the following general classes of inorganic acids: sulfinic acid, sulfonic acid, sulfuric acid, and vanadic acid.

The following specific compounds are indicative of those having the chemical, physical and electrical properties so as to come within the broad scope of this invention:

*Sulfinic acid.*—Ethyl ethanesulfinate, butyl ethanesulfinate, butyl butanesulfinate.

*Sulfuric acid.*—Ethylene sulfate and trimethylene sulfate, ethyl-n-propyl sulfate, ethyl-n-butyl sulfate.

*Sulfonic acid.*—Methyl-p-toluene sulfonate, ethyl-p-toluene sulfonate, and 5,2-$(CH_3)_2CH(CH_3)C_6H_3$ benzene sulfonate.

*Vanadic acid.*—Triethyl vanadate, tri-isopropyl vanadate.

Certain organic esters of inorganic acids alternatively are unsuitable for use with this invention because they do not possess the broad range of liquidity and/or the stability under electrical stress and elevated temperatures necessary. Such a class of esters are the boric acid esters which appear to readily deteriorate upon operation in an electrolytic capacitor.

The solutes which are useful in the non-aqueous electrolyte systems are salts of a non-metallic cation and a film-forming anion. By the term "film-forming anion" is meant an ion readily reducible at the anode so as to effect reparation of the oxide film should any injury of the film occur during operation, or if used in the formation process, to produce the desired dielectric film. The non-metallic cations thus include ammonium and organic substituted ammonium radicals such as tri-n-butylammonium, tri-ethanolammonium, urea, diethanolammonium, etc. The film-forming anion on the other hand includes the acetate ion, arsenate ion, borate ion, phosphate ion, picramate ion, tartrate, vanadate, chromate, dichromate, permanganate, nitrate, molybdate, formate, etc. Thus salts illustrative of this invention include ammonium acetate, ammonium arsenate, ammonium nitrate, amonium oxalate, and the reaction product of a compound under the A list with a copound under the B list below:

A
Organic amines
Organic hydroxyl amines
Organic hydrazines

B
Quinazerin-2-sulfonic acid
Flavianic Acid
Anthraquinone 2,6-disulfonic acid
2,4,6-trinitrophenyl acetic acid
Alizirin sapherole B
Picric acid
2,4,6-trinitroresorcinol styphnic acid
3,5-dinitro-o-cresol
2,4-dinitro phenol
2,4-dinitro phenyl acetic acid
2,4,6-trinitrophenoxy acetic acid
Anthraquinone-2-sulfonic acid
2,5-dihydroxy quinone
Tetrahydroxy quinone In the utilization of the various solutes set forth in this specification, consideration must be given to two fundamental aspects, namely the level of solubility required for any desired application and the ability of the oxidizing portion of the solute to perform its fundamental task in the solvent which is being used.

Preferably, the solutes used form a ratio of from about ½ to about 20% by weight of the solvent present. Smaller amounts of solute, however, can be used quite advantageously in certain limited applications. In the form of capacitors shown in Figs. 1, 2 and 3, the condenser unit 1 is of the rolled foil type being made up of a pair of foils 2, 3 formed of a film-forming metal such as tantalum, aluminum and zirconium spaced from one another by layers 4 and 5 of a condenser paper, such as calendered or uncalendered kraft paper. In Fig. 2 which is directed to the polarized electrolytic construction, the anode 3 has an oxide film 6 on a surface, while the cathode foil 4 does not have an appreciable dielectric oxide coating. The non-polarized unit of Fig. 3 for alternating current applications has an oxide dielectric film 6 on both of the electrode foils 3 and 4. The assembly of foil and kraft paper is rolled into a compact cylinder. Metal terminals 8 and 9, preferably formed of the same metal as the foils, are fastened to the ends of the respective foils as by spot welding or crimping.

The condenser unit 1, impregnated with the electrolyte of the invention, is enclosed in a tubular can 11 of a suitable non-corrosive metal such as silver or silver plated copper. The terminals 8 and 9 extend from the respective ends of the tubular can 11, passing through a resinous end seal 12 which confines the electrolyte to the wound section. Positioned against the inner surface of the tubular can 11 is a tube of kraft paper 13 which is saturated with the electrolyte 14.

In the form of the condenser shown in Fig. 4, the anode is in the form of an oxide coated etched or unetched wire of the film-forming metals previously set forth. The wire may be spiralled or straight depending upon the total capacity required. The anode is placed in an outer tubular can 22 of a metal such as silver. Within the can 22 is a spacer structure in the form of a paper tube 24 and a paper spacer disc 25 cooperating to cover the inner surfaces of said can. The anode shown here in the form of a straight wire 28 has one end placed against the spacer disc 25 and its other end filled with an encircling resin gasket 30 that can be pushed into the can. The paper tube 24 is short enough to permit the gasket 30 to be forced into the can and leave above it at least a millimeter or so of height to receive and anchor a plastic seal 26. Prior to placing the anode wire 28 into the can, the electrolyte of the invention designated 34 is placed in the container and the outer end of the anode wire 28 flattened as shown at 36. Also, before insertion of the anode wire 28, a flexible lead wire 38 of nickel for example can have its end welded to the flattened portion 36, preferably by a spot weld. To the outside of the blind end of the can 22, there is fastened by solder 40 another lead wire 42.

A number of typical examples of the practice of my invention are given below. Electrolytic capacitors were made up consisting of 4½ mil thick aluminum foils of 99.99% purity etched and formed in boric acid solution to 375 v. of 1-square inch area as the anodes, 1 mil unformed unetched aluminum foils as the cathodes, and 4 mil glass paper separators between the anode and cathode.

An electrolyte consisting of 1 gram tri-n-butyl ammonium picrate (recrystallized from alcohol) dissolved in 50 cc. of tri-n-butyl phosphate (the solvent was redistilled from the commercially available product obtained from the Commercial Solvents Corporation, at a boiling point of 142° C. at a pressure of 0.25 mm.) was introduced into the aforementioned capacitor structure at room temperature. The unit was found to have a temperature operational range in excess of from −60° C. to +200° C. and was characterized by a very low internal resistance, unusually constant capacitance over the entire temperature range, and was further featured by a relatively stable low dissipation factor over this range. The capacitance varied from about 1 microfarad per square inch of anode surface area at −60° C. to about 1.3 microfarads per square inch of anode surface area at +200° C.

Similar results are also obtained with the following electrolytes:

5% ammonium acetate and 95% tri-isoamyl phosphate
10% ammonium pentaborate, 30% triethylene glycol and 60% triethyl phosphate
2% of the sodium salt of quinizarin-2-sulfonic acid and 98% diethyl-2-chloroethyl phosphate
2 grams of triethanol ammonium picrate and 48 grams of dimethyl 1-methoxy ethyl phosphate
1% of phenylhydrazine salt of falvianic acid and 99% of diethyl-[(1-methyl-2(ethyl carboxylate))vinyl] phosphate
8% of tri-isoamyl ammonium picrate and 92% of naphthyl di-isoamyl phosphate
5% of bis(triethylamine) salt of anthraquinone 2,6- disulphonic acid and 95% of diethyl-2-chlorophenyl phosphate
6% of ammonium acetate and 94% of tri-isobutyl phosphite
6% tri-n-propyl ammonium picrate and 94% of diethyl ethane phosphonate
5% tri-n-propyl ammonium picrate and 95% dipropyl ethyl phosphinate
15% triethanol ammonium picrate and 85% ethyl phenyl ethyl phosphinate As shown above, this invention constitutes a decided improvement over previously known electrolytic systems in that the use of the disclosed solvents and in particular the preferred phosphorous compounds as solvents in 200° C. and higher. Additionally, these systems are not corrosive in nature and are further characterized by such low vapor pressures at elevated temperatures that in most applications venting of the electrolytic capacitor or electrical component is not necessary. A preferred class of organo phosphorous compounds are stable neutral esters which are non-toxic in nature, electrically stable to high electrical stress and are susceptible to simple impregnation techniques.

An electrical device which is operable over the extreme temperature range which has been indicated in this specification of necessity undergoes marked physical structural changes when traversing the entire breadth of this range. Many applications find the construction of Fig. 1 suitable, although in high temperature units, the containment of my liquid electrolytes may present possible difficulties unless suitable measures are taken to prevent their egress. In addition to preventing egress of the electrolyte from the containing structure of the electrical device, it is necessary to maintain the electrodes fully insulated, one from the other, and for this reason, the plastic dielectrics are finding rapid acceptance as dielectric gaskets and washers of high resistivity and inertness chemically. It has been found practical to contain the electrolyte within the electrical component for high temperature applications by utilizing a structure similar to that forming the basis of a U.S. patent application by Walter S. Schroeder, Serial No. 340,710, filed March 6, 1953, and now abandoned, which has been modified by the insertion of a steel spring washer at the bottom of the cup-like or alternatively a tube-like container. The crimping assembly is such that the capacitor structure is forced downwardly against the steel spring washer so that it remains in a continual stressed state which thus serves to yield sufficient pressure over the entire temperature range so as to prevent egress of the liquid electrolyte from the electrical device.

As many apparently widely different embodiments of this invention may be made without departing from the spirit and scope hereof, it is to be understood that the invention is not limited to the specific embodiments hereof except as defined in the appended claims.

This application forms a continuation-in-part of my copending United States patent application, Serial No. 365,519, filed July 1, 1953, and now abandoned.

I claim:
1. An electrolytic capacitor having a plurality of electrodes, one of said electrodes being a formed valve metal, and a non-aqueous electrolyte contiguous with said electrodes comprising a solute of the salt of a non-metallic cation and an oxidizing anion dissolved in a stable organic ester acid of the group consisting of phosphoric, phosphorous, phosphinous and phosphonic acids.
2. The capacitor of claim 1 in which the solvent is a trialkyl phosphite.
3. The capacitor of claim 1 in which the solvent is a completely esterified phosphoric acid.
4. The capacitor of claim 1 in which the solvent is a completely esterified phosphonic acid.
5. The capacitor of claim 1 in which the solvent is a completely esterified phosphinous acid.
6. A non-aqueous electrolytic system for capacitor electrolytes consisting essentially of a solute of a salt of a non-metallic cation and an oxidizing anion dissolved in a stable organic ester of acid of the group consisting of phosphoric, phosphorous, phosphinous and phosphonic acids.
7. A system as claimed in claim 6 in which the solvent is a trialkyl phosphite.
8. A system as claimed in claim 6 in which the solvent is a completely esterified phosphoric acid.
9. A system as claimed in claim 6 in which the solvent is a completely esterified phosphonic acid.
10. A system as claimed in claim 6 in which the solvent is a completely esterified phosphinous acid.

References Cited in the file of this patent
UNITED STATES PATENTS

| | | |
|---|---|---|
| 1,959,130 | Hambuechen | May 15, 1934 |
| 2,321,997 | Compton | June 15, 1943 |
| 2,566,908 | Ruscetta | Sept. 4, 1951 |
| 2,759,132 | Ross | Aug. 14, 1956 |
| 2,786,165 | Ross | Mar. 19, 1957 |
| 2,830,237 | Ross | Apr. 8, 1958 |